No. 696,349. Patented Mar. 25, 1902.
H. F. MAYNES.
CHANGEABLE GEAR FOR BICYCLES.
(Application filed July 2, 1901.)
(No Model.)
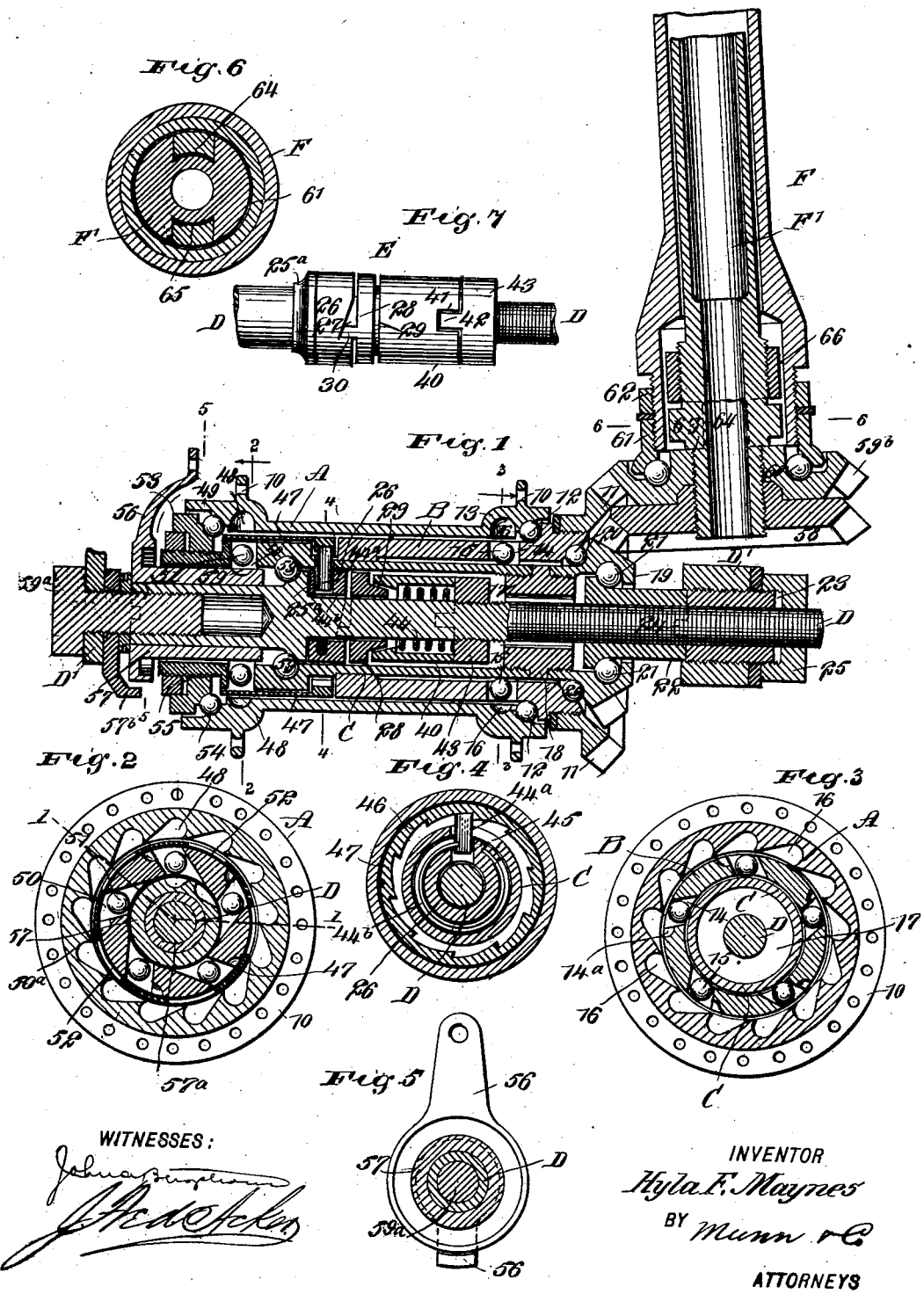
WITNESSES:
INVENTOR
Hyla F. Maynes
BY Munn & C
ATTORNEYS
THE NORRIS PETERS CO., PHOTO-LITHO., WASHINGTON, D. C.

UNITED STATES PATENT OFFICE.

HYLA F. MAYNES, OF CORNING, NEW YORK.

CHANGEABLE GEAR FOR BICYCLES.

SPECIFICATION forming part of Letters Patent No. 696,349, dated March 25, 1902.

Application filed July 2, 1901. Serial No. 66,812. (No model.)

*To all whom it may concern:*

Be it known that I, HYLA F. MAYNES, a citizen of the United States, and a resident of Corning, in the county of Steuben and State of New York, have invented a new and Improved Changeable Gear for Bicycles, of which the following is a full, clear, and exact description.

The purpose of the invention is to provide, in a chainless driving mechanism for bicycles and the like, a means for changing the gear, and consequently the speed, and, further, to provide means for bringing the changeable gear into action as a brake.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal horizontal section through the hub of the rear wheel of the bicycle and likewise a longitudinal horizontal section through a portion of the connection between the said hub and the crank-hanger, the section being taken on the line 1 1 of Fig. 2. Fig. 2 is a transverse section taken practically on the line 2 2 of Fig. 1. Fig. 3 is a vertical section taken substantially on the line 3 3 of Fig. 1. Fig. 4 is a transverse section taken on the line 4 4 of Fig. 1. Fig. 5 is a transverse section taken substantially on the line 5 5 of Fig. 1. Fig. 6 is a transverse section taken substantially on the line 6 6 of Fig. 1, and Fig. 7 is a side elevation of the clutch mechanism which is carried by the axle of the rear wheel.

A represents the hub of the rear wheel of a bicycle provided with the usual means 10 for the attachment of the spokes. Within the main hub A auxiliary driving-hubs B and C are located. The outer auxiliary hub B is a slow-speed hub and the inner auxiliary hub C a high-speed hub. The low-speed hub B extends out beyond one end of the main hub and terminates short of the opposite end of the main hub A, and at the extended end of the auxiliary or low-speed hub B a gear 11 is screwed thereon or secured thereto in any suitable or approved manner. Balls 12 are located between the low-speed hub B near its outer end and an enlargement 13 at the end of the main hub A, as is shown in Fig. 1. The low-speed hub B is provided with a series of diagonal pockets 14, (shown best in Fig. 3,) and in each of said pockets a ball 15 is loosely mounted. In the inner face of the enlargement 13 of the main hub corresponding yet oppositely-inclined pockets 16 are formed, and when the balls 15 leave the pockets 14 in the low-speed hub they enter the pockets 16 in the main hub, and the low-speed hub then turns with the main hub, the balls 15 resting in the pockets 16 and in depressions $14^a$ in one side of the pockets 14 in the low-speed hub, as is shown in Fig. 3; but only one ball 15 is brought into action at one time.

The inner or high-speed hub C is screwed upon a collar 17, which collar is loosely mounted on the shaft or axle D of the rear wheel, and the shaft or axle is stationarily located in the frame D' of the bicycle. The sleeve or collar 17, just referred to, is usually provided with projections 18, adapted to receive a screw-driver or other tool, so that the sleeve may be disconnected from the inner or high-speed hub C when desired, and a gear 19 is screwed upon this sleeve or collar 17, as shown in Fig. 1. Both the high-speed gear 19 and the low-speed gear 11 are bevel-gears. Balls 20 intervene the high-speed gear 19 and the end of the low-speed hub carrying the low-speed gear 11, as is also shown in Fig. 1, and balls 21 intervene the high-speed gear 19 and a cone 22, screwed upon a threaded end portion of the axle D. This cone is prevented from having end movement by contact with a sleeve 23, mounted on the threaded portion of the axle D and screwed into the frame, the sleeve having lugs 24, which enter recesses in the cone 22. A nut 25 is located at the outer end of the threaded portion of the shaft or axle D, having bearing against a washer engaging with the frame D', and this nut 25 is screwed upon the said sleeve 23.

The shaft or axle D, near its center, is provided with an exterior collar $25^a$, as shown in Figs. 1 and 7, and one member 26 of a clutch E is loosely mounted on the said shaft or axle having bearing against the collar $25^a$. This member 26 of the clutch is provided with a recess 27 in its inner face, having an inclined wall, as shown in Fig. 7, and this inclined wall is adapted to be engaged by an extension 30 from a second section 28 of the clutch, likewise loosely mounted on said shaft or axle D. This second section 28 of the clutch has a conical hub 29 at its inner portion, as is shown in Figs. 1 and 7. The hub 29 is adapted to enter a sleeve 40, which sleeve is loose on the shaft or axle D and has a conical inner face at its outer end to engage with the conical hub 29 of the clutch-section 28. The sleeve 40 is also provided at its inner end with a recess 41, and this recess 41 receives a lug 42, extending from a nut 43, screwed on the shaft or axle D, so that the collar or sleeve 40 may have end movement but cannot turn. A spring 44 is located within the sleeve or collar 40 around the axle D, which spring serves to hold the two clutch-sections 26 and 28 in engagement with each other.

A pin 44$^a$ extends through a circumferential opening 45, produced in the high-speed hub C, as is shown in Figs. 1 and 4, and a spring 44$^b$, located in the clutch-section 26, engages with this pin, normally forcing it outward. The pin 44$^a$ likewise has sliding movement in an opening produced in the said clutch-section 26, as is also best shown in Fig. 4. The pin 44$^a$ is normally held in engagement with ratchet-teeth 46, formed upon the inner face of a sleeve 47, which sleeve loosely surrounds the high-speed hub C, and that portion of the sleeve having the teeth 46 therein enters an annular exterior groove in said high-speed hub, as is also shown in Fig. 1.

An enlargement 49 is formed at the end of the main or wheel hub opposite the end heretofore alluded to, and in this enlargement pockets 48 are formed, corresponding to the pockets 16 at the opposite end of the wheel-hub. These pockets 48 are adapted to register with diagonal pockets 50, produced in the high-speed hub and corresponding to the pockets 14 in the low-speed hub. The pockets 48 and 50 are inclined in opposite directions. Each pocket 50 in the high-speed hub carries a ball 51, and in each pocket 50 a recess 50$^a$ is produced in one side. When a ball is thrown out from a pocket 50 and enters a pocket 48, it will also enter a recess 50$^a$, and the high-speed hub will turn with the wheel-hub, the low-speed hub at that time rotating slowly, as it cannot travel as fast as the high-speed hub.

The sleeve 47, engaging with the pin 44$^a$, extends over the pockets 50 in the high-speed hub, and this portion of the sleeve is provided with a series of openings 52, capable of being brought in registry with the pockets 50 and pockets 48, so as to bring the high-speed hub into action; but when the high-speed hub is out of action and the low-speed hub is in action the plain portions of the said sleeve 47 will be carried over the pockets 50 in the high-speed hub to close the same. This action is brought about by back-pedaling. Just prior to back-pedaling the pedals are stopped for an instant, and the clutch E is then brought into action, and as the pin 44$^a$ is turned with the clutch when back-pedaling is commenced the said pin will cause the sleeve 47 to be turned a sufficient distance to either uncover or cover the pockets 50 in the high-speed hub, according to whether the low-speed hub is to be brought into action or the high-speed hub.

A collar 53 is screwed upon the outer end of the high-speed hub, and balls 54 intervene this collar and the enlargement 49 of the wheel-hub, as shown in Fig. 1, the collar 53 being prevented from moving by means of a lock-nut 55, likewise screwed on the said high-speed hub. A brake-arm 56, provided with an attached sleeve 57 is loosely mounted on the shaft or axle D, turning thereon. The brake-arm 56 of the sleeve 57 is adapted for attachment to any form of brake, and the sleeve is provided with a recess 59 in its exterior, the recess being just below the pockets 50 in the high-speed hub, so that in back-pedaling the ball 51 in the high-speed hub which has been in action will drop into the recess 59 of the sleeve 57 and cause the brake-arm 56 to turn, thus applying the brake. The brake-arm is prevented from turning too far by engagement with a check 57$^b$, likewise carried by the axle or shaft D. At this end the axle or shaft D is tubular and receives the threaded stem of a nut 59$^a$, which nut passes through and engages with the frame D' at that side of the machine.

F represents a frame at one side of the machine, which leads to the crank-hanger, and F' represents a shaft which turns in said frame. At the lower end of the shaft F' a bevel-gear 58 is screwed or otherwise secured, and this gear 58 meshes with the high-speed gear 19, as is shown in Fig. 1. A second gear 59$^b$ is mounted to screw on the shaft F', or it may be rigid thereto, and this second gear 59$^b$ meshes with the low-speed gear 11, carried by the hub of the rear wheel. The gear 59$^b$, however, is preferably loosely mounted on the shaft F'; but is held from turning on said shaft by lugs 64, carried by the gear, entering recesses 65 in the shaft, as shown in Fig. 6. A sleeve or collar 66 is screwed upon the shaft F' to an engagement with the said lugs 64, thus fixing the gear 59$^b$ rigidly in position. The hub of the gear 59$^b$ engages with a shoulder 63 on the shaft F', so that the gear 59$^b$ is virtually held between such shoulder and the sleeve or collar 66, which is practically a lock-nut.

A cone 61 is screwed upon the frame F at its lower end and is prevented from turning by a nut and washer 62. This cone engages with balls 60, which balls travel in a suitable race produced in the gear 59$^b$ adjacent to its hub-section.

Having thus described my invention, I claim as new and desire to secure by Letters Patent—

1. In a changeable gear for bicycles, a hub for the rear wheel, provided with independently-acting gears, one gear being for high speed and the other for low speed, a drive-shaft adapted to drive the hub of the said rear wheel, which drive-shaft carries two gears one meshing with the high-speed gear of the hub and the other with the low-speed gear of the hub, and means for bringing either the high-speed or the low-speed gear in action through back-pedaling, for the purpose set forth.

2. In a changeable gear for bicycles, a hub for the rear wheel, provided with independently-acting gears, one gear being for high speed and the other for low speed, a drive-shaft adapted to drive the hub of the said rear wheel, which drive-shaft carries two gears, one meshing with the high-speed gear of the hub and the other with the low-speed gear of the hub, and means for bringing either the high-speed or the low-speed gear in action through back-pedaling, and a brake-operating arm likewise carried by the hub of the rear wheel, which arm is also brought into action by back-pedaling, as described.

3. A changeable-speed gear for bicycles, comprising a hub for the rear wheel provided with separate gears for high and low speeds, a rotating side shaft provided with gears rigidly connected therewith for engaging said separate gears independently, and a back-pedaling device for connecting either said high gear or said low gear with one of said gears upon said shaft.

4. A changeable-speed gear for velocipedes, comprising a hub, a rear wheel provided with separate high and low speed gears, corresponding rigidly-connected gears having the same axis for both, for engaging said separate speed-gears independently, and a back-pedaling device for connecting either of said high or low speed gears with its corresponding one of said rigidly-connected gears.

In testimony whereof I have signed my name to this specification in the presence of two subscribing witnesses.

HYLA F. MAYNES.

Witnesses:
J. FRED. ACKER,
JNO. M. RITTER.